(12) United States Patent
Hicks et al.

(10) Patent No.: US 6,874,218 B2
(45) Date of Patent: Apr. 5, 2005

(54) APPARATUS AND METHOD FOR ATTACHING A SEAL TO AN ENCAPSULATED WINDOW ASSEMBLY

(75) Inventors: Thomas S. Hicks, Allen, MI (US); Thomas M. Lingle, Temperance, MI (US)

(73) Assignee: Pilkington North America, Inc., Toledo, OH (US)

( * ) Notice: Subject to any disclaimer, the term of this patent is extended or adjusted under 35 U.S.C. 154(b) by 0 days.

(21) Appl. No.: 10/442,470

(22) Filed: May 21, 2003

(65) Prior Publication Data

US 2004/0016099 A1 Jan. 29, 2004

Related U.S. Application Data

(60) Provisional application No. 60/398,454, filed on Jul. 25, 2002.

(51) Int. Cl.⁷ .................................................. B23P 19/02
(52) U.S. Cl. .............................. 29/450; 29/235; 29/239; 29/255; 277/628; 277/637; 277/642
(58) Field of Search ................................ 277/628, 630, 277/637, 642, 922, 924, 925, 603; 296/107.04; 29/897.2, 428, 402.02, 445, 449, 454, 464, 521, 524, 888.3, 437, 450, 235

(56) References Cited

U.S. PATENT DOCUMENTS

| | | | |
|---|---|---|---|
| 2,189,138 A | * | 2/1940 | Eichner .......................... 52/208 |
| 2,647,289 A | * | 8/1953 | Harbert ......................... 52/208 |
| 3,363,303 A | * | 1/1968 | Hodgson ....................... 29/235 |
| 3,488,828 A | * | 1/1970 | Gallagher ..................... 29/451 |
| 3,550,242 A | * | 12/1970 | Dallen .......................... 29/235 |
| 4,092,394 A | * | 5/1978 | Dixon .......................... 264/150 |
| 4,165,083 A | * | 8/1979 | Dochnahl ..................... 277/642 |
| 4,172,313 A | * | 10/1979 | Takahashi ..................... 29/235 |
| 4,185,371 A | * | 1/1980 | Barnett ......................... 29/235 |
| 4,614,347 A | * | 9/1986 | Kruschwitz ................. 277/641 |
| 4,620,354 A | * | 11/1986 | Hess et al. ..................... 29/417 |
| 4,716,641 A | * | 1/1988 | Shrimpton, Ronald J. .... 29/235 |
| 4,738,482 A | | 4/1988 | Böhm et al. |
| 4,897,913 A | * | 2/1990 | St. Angelo, Jr. et al. ...... 29/450 |
| 4,996,756 A | * | 3/1991 | Bright et al. ............... 29/43.58 |
| 5,010,689 A | * | 4/1991 | Vaughan ...................... 49/440 |
| 5,115,551 A | * | 5/1992 | Goedderz et al. ............. 29/450 |
| 5,462,292 A | * | 10/1995 | Yamane ...................... 277/642 |
| 6,785,948 B2 | * | 9/2004 | Cittadini et al. .............. 29/450 |

FOREIGN PATENT DOCUMENTS

| | | |
|---|---|---|
| DE | 199 23 725 C | 7/2000 |
| EP | 0 155 642 A | 8/1976 |
| GB | 1 517 917 A | 7/1978 |
| GB | 1 447 491 A | 9/1985 |

* cited by examiner

*Primary Examiner*—David P. Bryant
*Assistant Examiner*—Stephen Kenny
(74) *Attorney, Agent, or Firm*—Marshall & Melhorn, LLC

(57) ABSTRACT

A seal attachment fixture and method are provided for attaching a seal to an encapsulated gasket disposed on a work piece, for example, an automotive window assembly. The seal attachment fixture includes fixture members, which slidably move into contact with openable lip portions on the gasket, thus exposing a retention slot defined therein. With the gasket retention slot open, a seal is then inserted within the slot.

12 Claims, 3 Drawing Sheets

APPARATUS AND METHOD FOR ATTACHING A SEAL TO AN ENCAPSULATED WINDOW ASSEMBLY

RELATED APPLICATIONS

This application claims the benefit of U.S. Provisional Patent Application Ser. No. 60/398,454, filed Jul. 25, 2002, which application is incorporated herein in its entirety.

BACKGROUND OF THE INVENTION

The present invention generally relates to a seal attachment fixture and, more particularly, to a seal attachment fixture for an encapsulated window assembly. Most particularly, the present invention relates to a seal attachment fixture for attaching a seal to an automotive window with an encapsulated gasket. A method for operating such a seal attachment apparatus is also disclosed.

Encapsulated window assemblies are well known in the art, where a first side of the gasket has been disposed onto at least a portion of the periphery of the window. The encapsulated window assembly may also include a means to: 1) mount the window assembly to a vehicle, 2) to minimize chipping and breaking of the window, and 3) to reduce noise, wind, and moisture from entering the vehicle. In addition, the encapsulated window assembly should be aesthetically pleasing.

Although the gasket is composed of plastic/rubber, the gasket material is typically relatively rigid and not flexible enough to allow a second side of the gasket to completely prevent noise, wind, and moisture from entering the vehicle. For this reason it is common to provide additional means to more reliably seal out these environmental elements.

One means that is used is to attach a more flexible plastic/rubber seal to the second side of the gasket. In the past the attachment of the seal to the gasket has been accomplished by using a gasket that has a female feature and/or retention slot defined along the second side, wherein the retention slot has lips covering the retention slot opening.

Next, a male portion of the seal is disposed within the gasket by manually spreading the lips apart at the opening of the gasket retention slot so as to allow entry of a male portion of the seal. When the male portion of the seal is completely in place in that portion of the retention slot, the lips of the gasket are released, which results in the seal being firmly seated.

This manual operation is continued until the entire male portion of the seal is firmly seated within the gasket. Thus, when the window is attached to a vehicle, the exterior portion of the seal is available to completely seal an area between the gasket and a vehicle aperture mounting surface.

There are, however, drawbacks to the abovementioned manual attachment of the seal. For example, an installer can damage the seal, the gasket, or window during manual seal installation. Also, by attaching the seal manually within the gasket, the gasket may become bunched. Both of these drawbacks can result in the leakage of noise, wind, and moisture into the vehicle compartment. In addition, manual attachment is time consuming and, therefore, costly.

Thus those skilled in the art continued to seek a solution to the problem of how to provide a more reliable seal attachment means for an automotive window and at a lower cost.

SUMMARY OF THE INVENTION

The present invention relates to a seal attachment fixture that is used for attaching a flexible seal to a relatively rigid gasket, the gasket having openable lip portions on a second side of the gasket, opposite a first side of the gasket that is disposed upon a work piece. The gasket may extend around at least a portion of the work piece. The work piece is preferably an encapsulated automotive window assembly.

The fixture comprises at least one fixture member and at least one locating stop for holding a work piece. The work piece includes at least a portion of a gasket having lip portions that define a retention slot therebetween. When the fixture member is moved into contact with the gasket, the fixture member urges the lip portions to open, thus exposing the retention slot for seal insertion.

A method of attaching the seal to the gasket is provided where the gasket is disposed on the work piece that is positioned on the seal attachment fixture, the work piece having openable lip portions that define the retention slot therebetween. The method comprises: 1) urging the separate fixture member into contact with the openable lip portions of the gasket, wherein the fixture members cause the lips of the gasket to open, and thereby to expose the retention slot defined within the gasket, 2) inserting a portion of the flexible seal into the gasket by inserting a male portion of the seal between the open lip portions of the gasket, 3) moving the fixture members out of contact with the gasket, thus allowing the lips of the gasket to close over the male portion of the flexible seal, and 4) removing the work piece with attached seal from the fixture.

Further objects and advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

Figure 1:
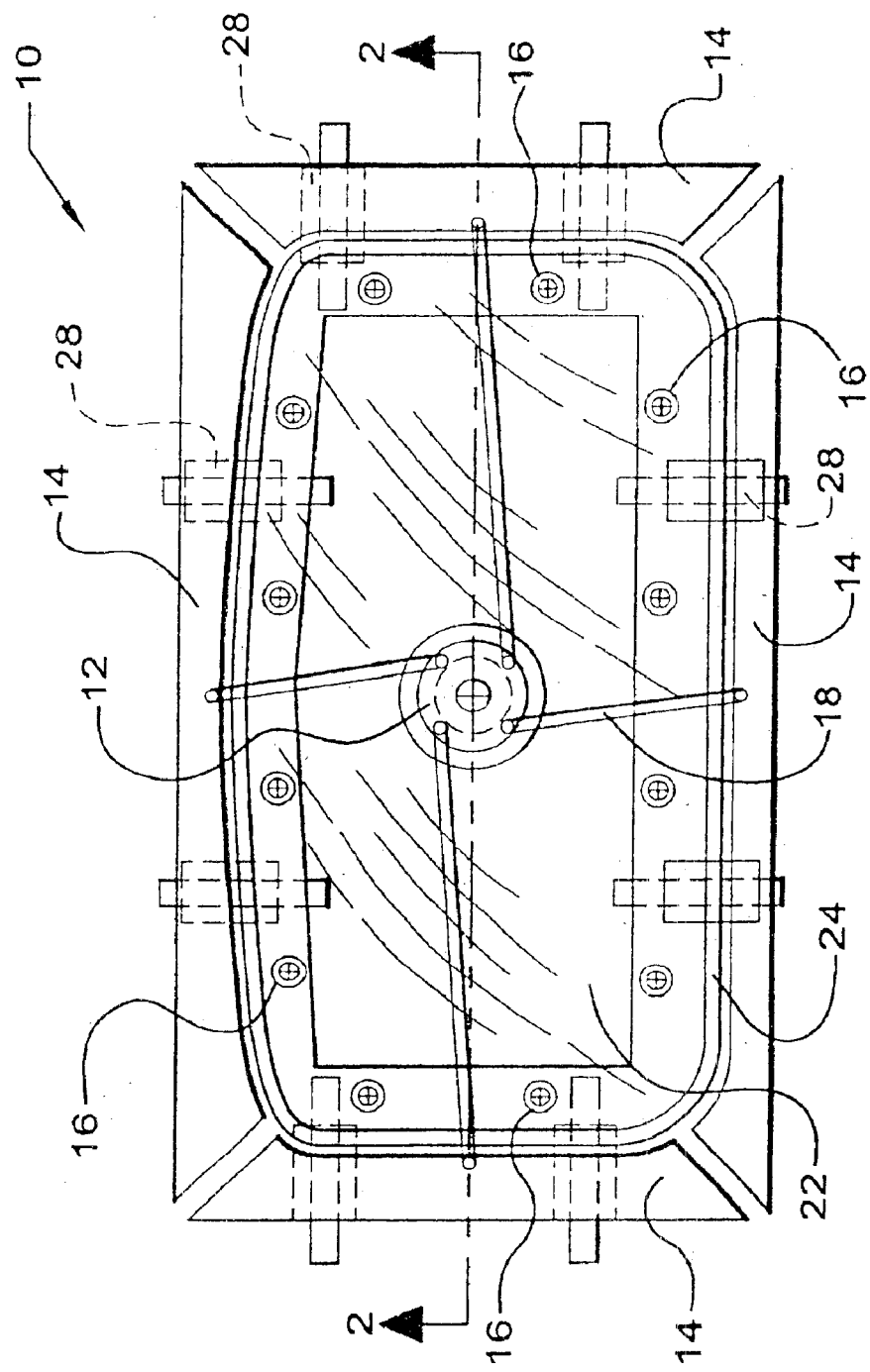
FIG. 1 is a plan view of a seal attachment fixture, with arms extended, in accordance with the present invention.

The present invention involves a seal attachment fixture 10 as shown in FIG. 1, where a work piece 22, for example, an automotive window with encapsulated gasket 24, is positioned within the seal attachment fixture 10.

The seal attachment fixture 10 comprises a plate 26 (shown in FIG. 2), a drive 42 that is attached to the plate 26, a rotating hub mechanism 12, which is rotatably attached to the drive 42, and having at least two arms 18, but preferably four arms 18. A first end of each arm 18 is pivotably attached to the rotating hub mechanism 12, while a second end of each arm 18 is pivotably attached to separate fixture members 14 that are slidably attached to at least two rails 28. The seal attachment fixture 10 also comprises at least one locating stops 16, but preferably a minimum of three (see FIG. 1), which are attached to the plate 26 and possibly adjustably attached to the plate 26.

Initially, as FIG. 1 illustrates, the rotating hub mechanism 12 is rotated by the drive 42, for example, a pneumatic cylinder, an electric motor, a hydraulic mechanism, or other rotating means that are known in the art, in a first direction to extend the arms 18. The extension of the arms 18 provides clearance between the fixture members 14 and the work piece, so that the work piece 22 can be positioned on the locating stops 16. The locating stops 16, which are positioned between the slidable fixture members 14 and inside of the gasket, are aligned with openable gasket lip portions 34 (refer to FIG. 3). With the arms 18 extended, as so described, the lips 34 are not in contact with the fixture members 14.

Next, the rotating hub mechanism 12 is rotated by the drive 42 in a second direction so that the arms 18 are retracted, which causes the fixture members 14 to come into contact with the lips 34. This results in the fixture members 14 spreading the lips 34 open and exposing a retention slot 32. The retention slot 32 is preferably defined within the gasket 24 on a side opposite a side of the gasket 24 that is disposed on the work piece 22.

Figure 5:
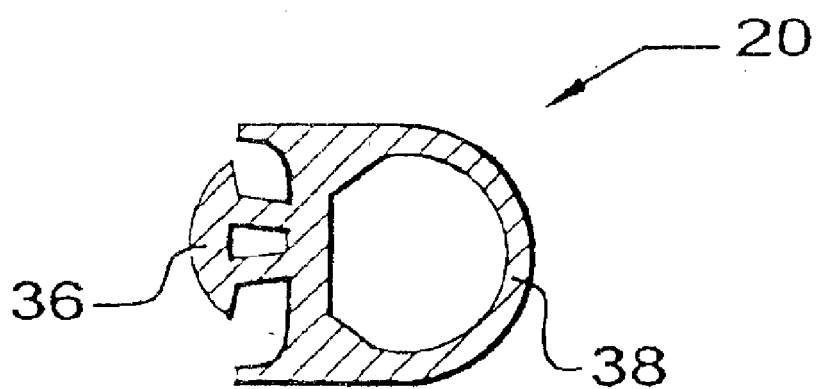
FIG. 5 is a cross-sectional view of the seal of FIG. 4.

A male portion 36 of a seal 20, as shown in FIG. 5, is inserted between the lips 34 and within the retention slot 32 (shown in FIG. 3) throughout the gasket 24. Insertion of the seal 20 may be by any appropriate method, for example, manually or robotically.

When the complete male portion 36 has been inserted into the retention slot 32 around at least a portion of the periphery of the gasket 24, the rotating hub mechanism 10 is rotated in the first direction so as to extend the arms 18. This rotation causes the arms 18 to slide the fixture members 14 out of contact with the lips 34, which close over the male portion 36 of the seal 20.

Thus, the work piece 22 is removed from the locating stops 16 with the seal male portion 36 attached to the gasket 24, while a seal exterior portion 38 is exposed outside of the gasket 24. This exterior portion 38 is then available for creating sealable contact between the work piece 22 and an automotive vehicle window aperture (not shown).

Figure 2:
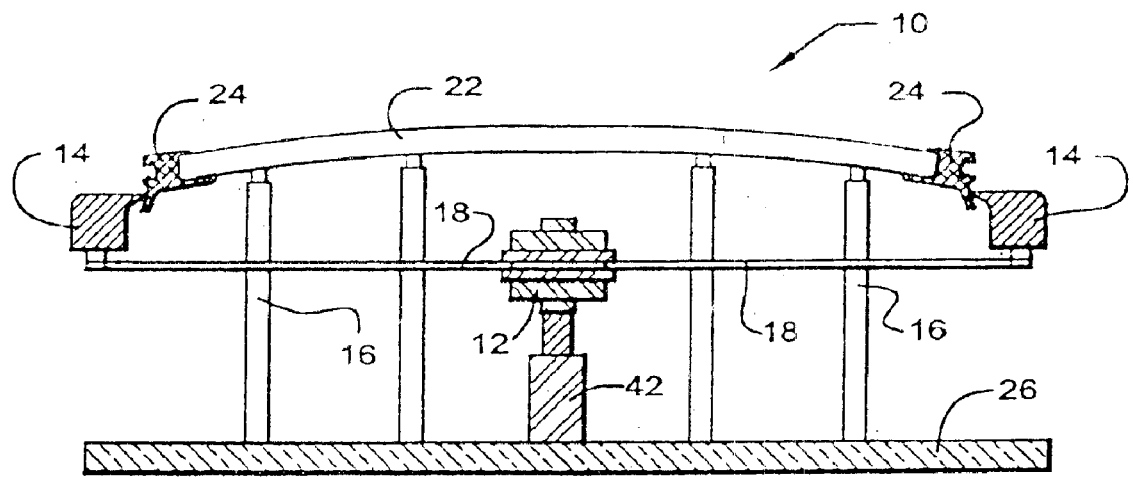
FIG. 2 is a cross-sectional view of the seal attachment fixture of FIG. 1 with arms retracted, taken along the 2—2 line of FIG. 1.
Figure 3:
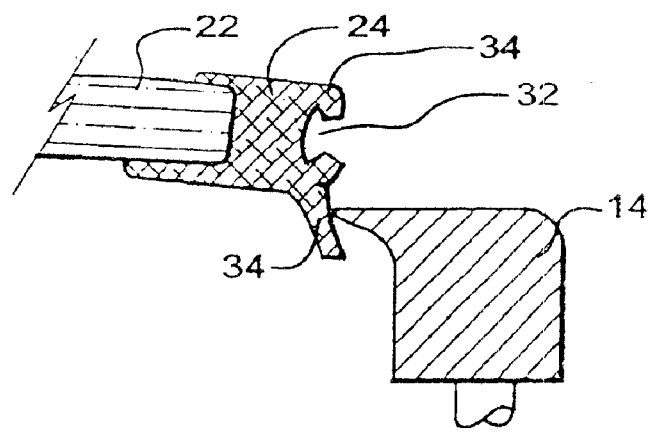
FIG. 3 is an exploded cutaway cross-sectional view of the work piece with gasket, seal, and fixture member of FIG. 2.

FIG. 2 illustrates a cross-sectional view of the seal attachment fixture of FIG. 1, taken along the 2—2 line of FIG. 1, however, with the arms 18 retracted. Therein are shown the fixture members 14 causing the lips 34 to be spread apart and exposing the gasket retention slot 32. FIG. 3 shows an exploded cutaway cross-sectional view of the work piece 22 with the lips 34 spread apart and the retention slot 32 exposed. It should be noted that the present invention may be practiced as shown where the fixture member 14 is pointed at the point of contact with the lips 34, but may also be non-pointed (not shown) and still be within the spirit and scope of the invention.

Figure 4:
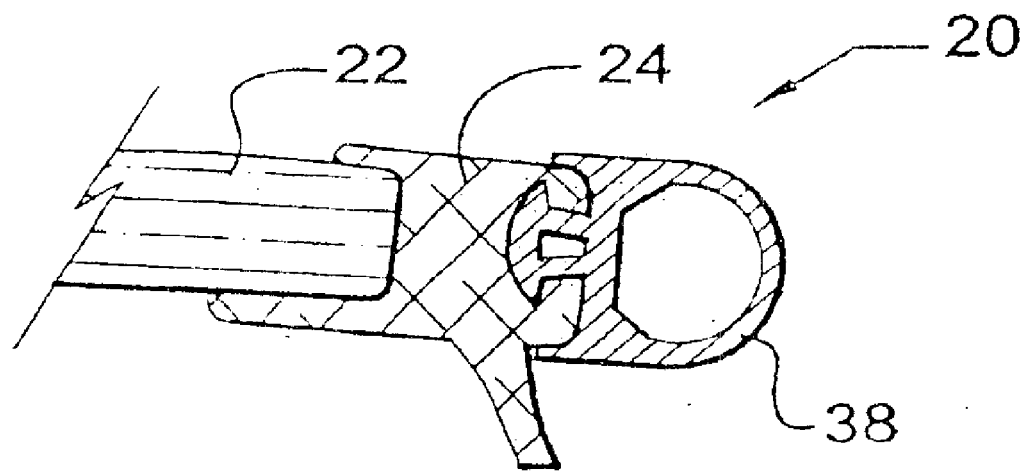
FIG. 4 is an exploded cutaway cross-sectional view of an edge of an assembled work piece with seal disposed within the gasket, in accordance with the present invention.

FIG. 4 illustrates an exploded cutaway cross-sectional view of an edge of an assembled work piece 22 with the seal 20 disposed within the gasket retention slot 32. Shown in FIG. 5 is a cross-sectional view of the seal 20 with the male portion 36 and the exterior portion 38. The encapsulated gasket 24 may be composed of any suitable thermoplastic or thermoset material. The seal 20 may be composed of any suitable extrudable plastic material.

A method of attaching the flexible seal 20 to the rigid gasket 24 is provided where the gasket 24 is disposed on the work piece 22, for example, an encapsulated window assembly, that is positioned on the seal attachment fixture 10, the work piece 22 having openable lip portions 34 that define the retention slot 32 therebetween. The method comprises: 1) urging the separate fixture members 14 into contact with the openable lip portions 34 of the gasket 24, wherein the fixture members 14 cause the lips 34 of the gasket 24 to open, and thereby to expose the retention slot 32 defined within the gasket 24, 2) inserting a portion of the flexible seal 20 into the gasket 24 by inserting a male portion of the seal 36 between the open lip portions 34 of the gasket 24, 3) moving the fixture members 14 out of contact with the gasket 24, thus allowing the lips 34 of the gasket 24 to close over the male portion 36 of the flexible seal 20, and 4) removing the work piece 22 with attached seal 20 from the fixture 10.

In accordance with the provisions of the patent statutes, the principles and modes of operation of this invention have been described and illustrated in its preferred embodiments. However, it must be understood that the invention may be practiced otherwise than as specifically explained and illustrated without departing from its spirit or scope.

What is claimed is:

1. A method of attaching a seal to a gasket, the method comprising:

providing a work piece having the gasket affixed to at least a portion thereof, the gasket having a pair of openable lip portions and a retention slot portion therebetween;

urging at least one fixture member into contact with at least one of the openable lip portions to open the lips, the contact being exterior to retention slot portion;

inserting a portion of the seal between the openable lip portions; and urging the fixture member out of contact with the gasket.

2. The method of claim 1, further comprising:

initially placing work piece, on which the gasket has been affixed, onto locating stops.

3. The method of claim 2, wherein urging the fixture member includes rotating a hub mechanism.

4. The method of claim 3, wherein rotating the hub mechanism includes moving a drive.

5. The method of claim 4, wherein rotating the hub mechanism includes aligning the fixture member and separate lip portions.

6. The method of claim 5, wherein urging the fixture member includes sliding the fixture member on rails.

7. The method of claim 6, further comprising adjusting the locating stops.

8. The method of claim 7, wherein inserting the fixture member includes a robot.

9. The method of claim 8, further comprising removing the work piece from the locating stops.

10. A method of attaching a seal to a vehicle window having a gasket disposed on at least a portion of the vehicle window's periphery, the method comprising:

disposing the vehicle window onto at least one locating stop;

urging at least two fixture members into contact with openable lip portions of the gasket, thus exposing gasket retention slots, the contact being exterior to the retention slots;

disposing seal portions in the retention slots; and urging the fixture members out of contact with the gasket, thus attaching the seal to the vehicle window.

11. The method of claim 10, wherein:

urging the fixture members includes utilizing a drive for rotating a hub mechanism, the hub mechanism is utilized for at least sliding the fixture members on rails, and disposing portions of the seal includes utilizing a robot.

12. The method of claim 11, further comprising removing the vehicle window from the locating stop.

* * * * *